United States Patent
Issaev et al.

(10) Patent No.: US 7,544,384 B2
(45) Date of Patent: *Jun. 9, 2009

(54) METHODS OF MAKING COATED BATTERY COMPONENTS

(75) Inventors: Nikolai N. Issaev, Woodbridge, CT (US); Michael Pozin, Brookfield, CT (US); Maya Stevanovic, Danbury, CT (US)

(73) Assignee: The Gillette Company, Boston, MA (US)

( * ) Notice: Subject to any disclaimer, the term of this patent is extended or adjusted under 35 U.S.C. 154(b) by 484 days.

This patent is subject to a terminal disclaimer.

(21) Appl. No.: 10/719,014

(22) Filed: Nov. 24, 2003

(65) Prior Publication Data

US 2005/0112274 A1    May 26, 2005

(51) Int. Cl.
*B05D 5/12* (2006.01)
*B05D 3/12* (2006.01)
*H01M 4/88* (2006.01)

(52) U.S. Cl. .................. 427/115; 427/361; 427/123; 427/383.1; 502/101

(58) Field of Classification Search ................ 427/115, 427/123, 361, 383.1; 429/231.9, 224, 233, 429/236, 242; 29/745, 746, 890.6; 502/101
See application file for complete search history.

(56) References Cited

U.S. PATENT DOCUMENTS

| | | | |
|---|---|---|---|
| 3,732,124 A | 5/1973 | Cailley | |
| 3,761,314 A | 9/1973 | Cailley | |
| 4,499,160 A | 2/1985 | Babai et al. | |
| 4,529,675 A | 7/1985 | Sugalski | |
| 4,755,440 A | 7/1988 | Peled et al. | |
| 5,418,084 A | 5/1995 | Georgopoulos | |
| 5,543,249 A * | 8/1996 | Takeuchi et al. | 429/217 |
| 5,554,463 A * | 9/1996 | Marincic et al. | 429/233 |
| 5,567,548 A | 10/1996 | Walk et al. | |
| 5,958,625 A | 9/1999 | Rao | |
| 6,110,622 A * | 8/2000 | Frysz et al. | 429/233 |
| 6,190,803 B1 | 2/2001 | Tomiyama et al. | |
| 6,322,928 B1 | 11/2001 | Thackeray et al. | |
| 6,365,299 B1 * | 4/2002 | Miyaki et al. | 429/218.1 |
| 6,368,365 B1 * | 4/2002 | Chi et al. | 29/623.1 |
| 6,447,957 B1 | 9/2002 | Sakamoto et al. | |
| 6,521,374 B1 | 2/2003 | Nakanishi et al. | |

(Continued)

FOREIGN PATENT DOCUMENTS

EP         116115         5/1986

(Continued)

OTHER PUBLICATIONS

Tischer et al ("Candidate materials for the sulfur electrode current collector", Corrosion Science, vol. 26, No. 5, pp. 377-388, 1986).*

(Continued)

*Primary Examiner*—Brian K Talbot
(74) *Attorney, Agent, or Firm*—Fish & Richardson P.C.

(57) ABSTRACT

A primary lithium battery can include a current collector that includes aluminum, a cap that includes aluminum, or both. The current collector can be coated with a cathode material. The aluminum battery components can have high mechanical strength and low electrical resistance.

37 Claims, 6 Drawing Sheets

U.S. PATENT DOCUMENTS

| | | | |
|---|---|---|---|
| 6,780,543 B2 | | 8/2004 | Yoshimura et al. |
| 2002/0028389 A1* | | 3/2002 | Sonoda et al. .............. 429/324 |
| 2003/0113622 A1 | | 6/2003 | Blasi et al. |
| 2003/0124421 A1 | | 7/2003 | Issaev et al. |
| 2003/0180611 A1 | | 9/2003 | Mikhaylik et al. |
| 2004/0264110 A1* | | 12/2004 | Michel et al. .............. 361/508 |

FOREIGN PATENT DOCUMENTS

| | | |
|---|---|---|
| EP | 0391720 | 6/1995 |
| FR | 1415519 | 9/1965 |
| JP | 02-204976 | 8/1990 |

OTHER PUBLICATIONS

Aluminum 1145-O Available Web Site: http://www.matweb.com/search/SpecificMaterialPrint.asp?bassnum=MA1140 Retrieved from the Internet prior to the filing of the application.

Aluminum 7075-O Available Web Site: http://www.matweb.com/search/SpecificMaterialPrint.asp?bassnum=MA7070 Retrieved from the Internet prior to the filing of the application.

Aluminum 6061-O Available Web Site: http://www.matweb.com/search/SpecificMaterialPrint.asp?bassnum=MA6010 Retrieved from the Internet prior to the filing of the application.

Allegheny Ludlum Type 316L Stainless Steel, UNS S31603 Available Web Site: http://www.matweb.com/search/SpecificMaterialPrint.asp?bassnum=NL316L Retrieved from the Internet prior to the filing of the application.

Aluminum 2024-O Available Web Site: http://www.matweb.com/search/SpecificMaterialPrint.asp?bassnum=MA2240 Retrieved from the Internet prior to the filing of the application.

List of References [online], 93 pages. Retrieved from: the Thomson Derwent World Patent Index. Retrieved prior to the filing of the application.

List of References [online], 103 pages. Retrieved from: the Thomson Derwent World Patent Index. Retrieved prior to the filing of the application.

List of References [online], 5 pages. Retrieved from: the Thomson Derwent World Patent Index. Retrieved prior to the filing of the application.

List of References [online], 31 pages. Retrieved from: the Thomson Derwent World Patent Index. Retrieved prior to the filing of the application.

List of References [online], 11 pages. Retrieved from: the Thomson Derwent World Patent Index. Retrieved prior to the filing of the application.

List of References [online], 5 pages. Retrieved from: the Thomson Derwent World Patent Index. Retrieved prior to the filing of the application.

List of References [online], 61 pages. Retrieved from: the Thomson Derwent World Patent Index. Retrieved prior to the filing of the application.

List of References [online], 2 pages. Retrieved from: the Thomson Derwent World Patent Index. Retrieved prior to the filing of the application.

Tischer et al., "Candidate Materials for the Sulfur Electrode Current Collector", Corrosion Science 26(5):371-375 (1986).

Aluminum 3105-O Available from website http://www.matweb.com.

http://www.dexmet.com/MicroGrid-Foils/process-variations.html.

http://www.dexmet.com/MicroGrid-Foils/metal-foil-product-range.html.

http://www.dexmet.com/MicroGrid-Foils/techinfo.html.

* cited by examiner

METHODS OF MAKING COATED BATTERY COMPONENTS

TECHNICAL FIELD

This invention relates to batteries including aluminum components.

BACKGROUND

Batteries are commonly used electrical energy sources. A battery contains a negative electrode, typically called the anode, and a positive electrode, typically called the cathode.

The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

SUMMARY

In general, a primary lithium battery includes a positive lead which can include aluminum. The positive lead is in electrical contact with the cathode of the battery. The cathode includes a current collector which can include aluminum.

In one aspect, a method of making a cathode for a primary lithium battery includes coating an expanded metal grid including aluminum with a composition including a cathode active material. In another aspect, a method of making a cathode for a battery includes coating an expanded metal grid including an aluminum alloy with a composition including a cathode active material, wherein the cathode active material includes a manganese dioxide and the composition includes a carbon source and a binder, drying the grid after coating, calendering the grid to a thickness of less than 20 mils (0.508 mm) after drying, sizing the grid after calendering, edge-cleaning the grid after sizing, heat treating the grid after edge-cleaning, and drying the grid under vacuum after heat treating the grid.

The composition can be a slurry. The cathode active material can include a manganese dioxide, a carbon fluoride such as carbon monofluoride, polycarbon monofluoride, graphite fluoride or $CF_x$, iron disulfide, or a vanadate. The composition can include a carbon source. The carbon source can include a carbon fiber, a graphite, an acetylenic carbon, or a combination thereof. The composition can include a binder. The binder can include an organic polymer. The binder can include poly(tetrafluoroethylene), poly(vinylalcohol), or a combination thereof. The grid can include a 1000 series aluminum, a 2000 series aluminum alloy, a 3000 series aluminum alloy, a 5000 series aluminum alloy, a 6000 series aluminum alloy, or a 7000 series aluminum alloy. The grid can include an aluminum alloy including 0-0.4% by weight of chromium, 0.01-6.8% by weight of copper, 0.05-1.3% by weight of iron, 0.1-7% by weight of magnesium, 0-2% by weight of manganese, 0-2% by weight of silicon, less than 0.25% by weight of titanium, 0-2.3% by weight of nickel, and 0-8.2% by weight of zinc. The grid can have a resistivity of less than 100 mΩ/cm, or of less than 10 mΩ/cm.

The grid can be pulled before coating. The grid can be leveled before coating. The grid can be dried after coating. The grid can be calendered after drying. Calendering can include passing the grid through a gap. The gap can have a thickness of less than 25 mils (0.635 mm). The grid can be heat treated after calendering. The grid can be dried under vacuum after heat treating. Primary lithium batteries including a positive lead that includes aluminum can have a lower impedance than batteries having a positive lead of a different material, for example stainless steel. The combination of a cathode current collector including aluminum and a positive lead including aluminum can provide greater corrosion stability and conductivity in a battery than the combination of a current collector including aluminum and a positive lead of stainless steel. Aluminum or an aluminum alloy can be less expensive than stainless steel.

The details of one or more embodiments are set forth in the accompanying drawings and the description below. Other features, objects, and advantages will be apparent from the description and drawings, and from the claims.

DETAILED DESCRIPTION

Figure 1:
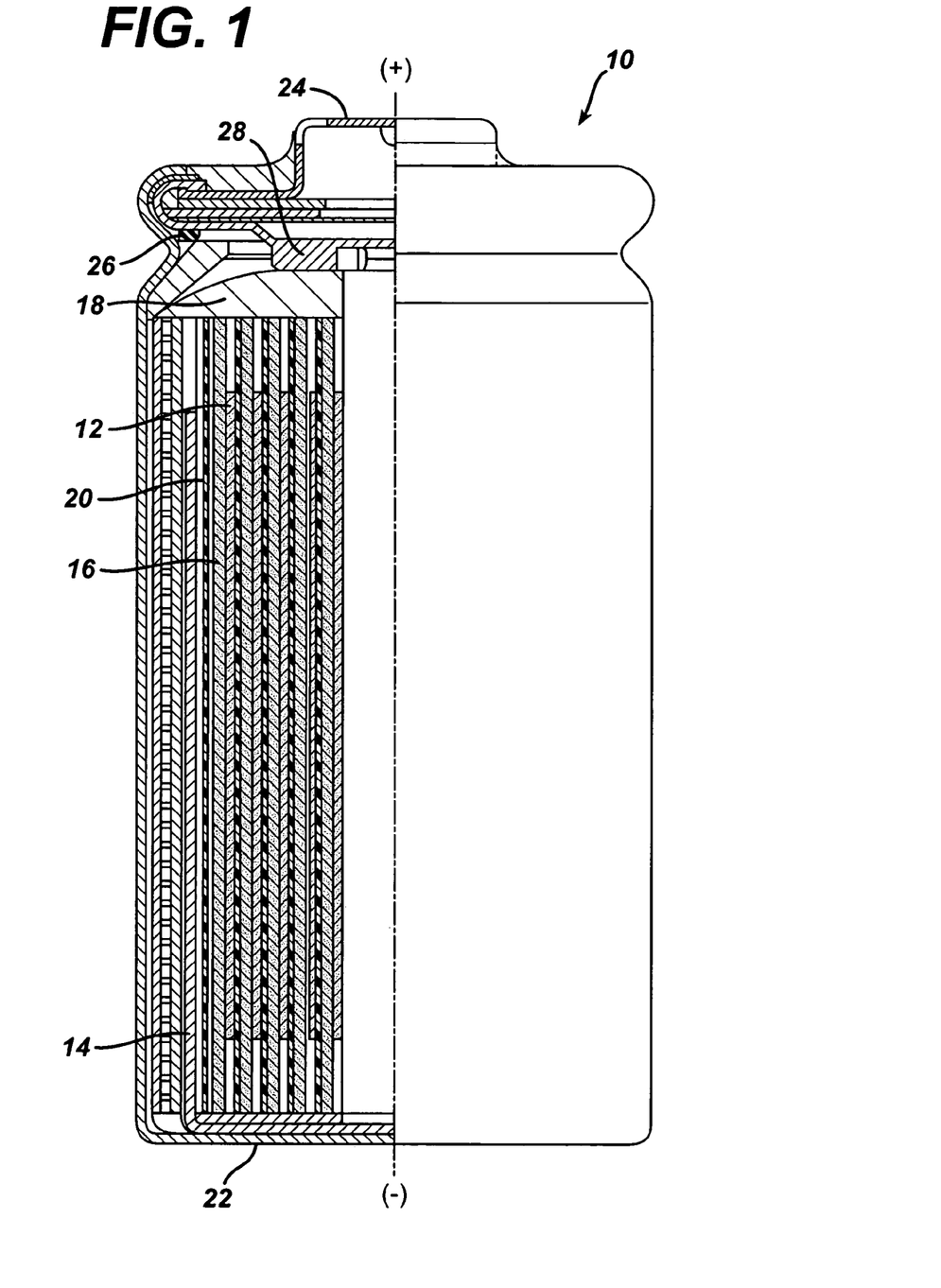
FIG. 1 is a schematic drawing of a battery.

Referring to FIG. 1, a primary lithium electrochemical cell 10 includes an anode 12 in electrical contact with a negative lead 14, a cathode 16 in electrical contact with a crown 18, a separator 20 and an electrolyte. Anode 12, cathode 16, separator 20 and the electrolyte are contained within housing 22. The electrolyte can be a solution that includes a solvent system and a salt that is at least partially dissolved in the solvent system. One end of housing 22 is closed with a positive external contact 24 and an annular insulating gasket 26 that can provide a gas-tight and fluid-tight seal. Crown 18 and positive lead 28 connect cathode 16 to positive external contact 24. A safety valve is disposed in the inner side of positive external contact 24 and is configured to decrease the pressure within battery 10 when the pressure exceeds some predetermined value. In certain circumstances, the positive lead can be circular or annular and be arranged coaxially with the cylinder, and include radial extensions in the direction of the cathode. Electrochemical cell 10 can be, for example, a cylindrical wound cell, a button or coin cell, a prismatic cell, a rigid laminar cell or a flexible pouch, envelope or bag cell.

Anode 12 can include alkali and alkaline earth metals, such as lithium, sodium, potassium, calcium, magnesium, or alloys thereof. The anode can include alloys of alkali or alkaline earth metals with another metal or other metals, for example, aluminum. An anode including lithium can include elemental lithium or lithium alloys, or combinations thereof.

The electrolyte can be a nonaqueous electrolyte solution including a solvent and a salt. The salt can be an alkali or alkaline earth salt such as a lithium salt, a sodium salt, a potassium salt, a calcium salt, a magnesium salt, or combinations thereof. Examples of lithium salts include lithium hexafluorophosphate, lithium tetrafluoroborate, lithium hexafluoroarsenate, lithium perchlorate, lithium iodide, lithium bromide, lithium tetrachloroaluminate, lithium trifluoromethanesulfonate, $LiN(CF_3SO_2)_2$, and $LiB(C_6H_4O_2)_2$. A perchlorate salt such as lithium perchlorate can be included in the electrolyte to help suppress corrosion of aluminum or an aluminum alloy in the cell, for example in the current collector. The concentration of the salt in the electrolyte solution can range from 0.01 molar to 3 molar, from 0.5 molar to 1.5 molar, and in certain embodiments can be 1 molar.

The solvent can be an organic solvent. Examples of organic solvents include carbonates, ethers, esters, nitrites and phosphates. Examples of carbonates include ethylene carbonate, propylene carbonate, diethyl carbonate and ethylmethyl carbonate. Examples of ethers include diethyl ether, dimethyl ether, dimethoxyethane and diethoxyethane. Examples of esters include methyl propionate, ethyl propionate, methyl butyrate and gamma-butyrolactone. Examples of nitrites include acetonitrile. Examples of phosphates include triethylphosphate and trimethylphosphate. The electrolyte can be a polymeric electrolyte.

Separator 20 can be formed of any separator material used in lithium primary or secondary battery separators. For example, separator 20 can be formed of polypropylene, polyethylene, polytetrafluoroethylene, a polyamide (e.g., a nylon), a polysulfone, a polyvinyl chloride, or combinations thereof. Separator 20 can have a thickness of from about 12 microns to about 75 microns and more preferably from 12 to about 37 microns. Separator 20 can be cut into pieces of a similar size as anode 12 and cathode 16 and placed therebetween as shown in FIG. 1. The anode, separator, and cathode can be rolled together, especially for use in cylindrical cells. Anode 12, cathode 16 and separator 20 can then be placed within housing 22 which can be made of a metal such as nickel or nickel plated steel, stainless steel, aluminum-clad stainless steel, aluminum, or an aluminum alloy or a plastic such as polyvinyl chloride, polypropylene, a polysulfone, ABS or a polyamide. Housing 22 containing anode 12, cathode 16 and separator 20 can be filled with the electrolytic solution and subsequently hermetically sealed with positive external contact 24 and annular insulating gasket 26.

Cathode 16 includes a composition that includes cathode active material that can undergo alkali ion insertion during discharge of battery 10. The active material can be, e.g., a metal oxide, halide, or chalcogenide; alternatively, the active material can be sulfur, an organosulfur polymer, or a conducting polymer. Specific examples include manganese dioxide, cobalt trifluoride, molybdenum sulfide, iron disulfide, thionyl chloride, molybdenum trioxide, sulfur, $(C_6H_5N)_n$, and $(S_3N_2)_n$, where n is at least 2. The active material can be a vanadate material, such as a vanadium pentoxide. Vanadate materials are described, for example, in U.S. Pat. Nos. 6,322,928 and 5,567,548, each of which is incorporated by reference in its entirety. The active material can also be a carbon monofluoride, such as a compound having the formula $CF_x$, where x is 0.5 to 1.0. The cathode composition can also include a binder, for example, a polymeric binder such as PTFE, PVDF, Kraton or Viton (e.g., a copolymer of vinylidene difluoride and hexafluoropropylene). The cathode composition can also include a carbon source, such as, for example, carbon black, synthetic graphite including expanded graphite or non-synthetic graphite including natural graphite, an acetylenic mesophase carbon, coke, graphitized carbon nanofibers or a polyacetylenic semiconductor.

The cathode includes a current collector on which the cathode active material can be coated or otherwise deposited. The current collector can have a region in contact with positive lead 28 and a second region in contact with the active material. The current collector serves to conduct electricity between the positive lead 28 and the active material. The current collector can be made of a material that is strong and is a good electrical conductor (i.e. has a low resistivity), for example a metal such as stainless steel, titanium, aluminum or an aluminum alloy. More specifically, the current collector advantageously is composed of a material having a high yield strength, e.g. greater than 2.5 lb/in, a high tensile strength, e.g. greater than 5 lb/in, and a low resistivity, e.g. less than $10^{-4}$ Ω·cm or less than $10^{-5}$ Ω·cm. The aluminum or aluminum alloy current collector can cost less and have a lower resistivity than one of either stainless steel or titanium.

Aluminum and aluminum alloys are generally grouped into series according to the other elements present in the material. For example, a 1000 series aluminum is almost pure aluminum, a 2000 series aluminum alloy contains primarily aluminum and copper, a 6000 series aluminum alloy contains primarily aluminum, magnesium and silicon, and a 7000 series aluminum alloy contains primarily aluminum and zinc. A 1000 series, 2000 series, 3000 series, 5000 series, 6000 series, or 7000 series aluminum alloy can be suitable in a current collector or a positive lead. In particular, the aluminum alloy can be a 2024, 6061, or a 7075 aluminum alloy. The compositions of several aluminum based materials are presented in Table 1. Compositions of other aluminum alloys can be found in, for example, Metals Handbook, Vol. 2—Properties and Selection: Nonferrous Alloys and Special-Purpose Materials, ASM International 10th Ed. 1990, which is incorporated by reference in its entirety.

TABLE 1

| Component (weight %) | Aluminum 1145 | Aluminum 2024 | Aluminum 3003 | Aluminum 5052 | Aluminum 6061 | Aluminum 7075 |
| --- | --- | --- | --- | --- | --- | --- |
| Aluminum | 99.45 min | 93.5 | 98.7 | 97.5 | 98 (balance) | 90 |
| Chloride | — | — | — | — | 50 ppm max | — |
| Chromium | — | 0.1 max | — | 0.15-0.35 | 0.04-0.35% | 0.18-0.28 |
| Copper | 0.05 max | 3.8-4.9 | 0.05-0.2 | 0.1 max | 0.15-0.4% | 1.2-2 |
| Iron | 0.55 max (w/ silicon) | 0.5 max | 0.7 max | 0.4 max | 0.7 max | 0.5 max |
| Magnesium | 0.05 max | 1.2-1.8 | — | 2.2-2.8 | 0.8-1.2 | 2.1-2.9 |
| Manganese | 0.05 max | 0.3-0.9 | 1-1.5 | 0.1 max | 0.15 max | 0.3 max |
| Silicon | 0.55 max (w/ iron) | 0.5 max | 0.6 max | 0.25 max | 0.4-0.8 | 0.4 max |
| Titanium | 0.03 max | 0.15 max | — | — | 0.15 max | 0.2 max |
| Vanadium | 0.05 max | — | — | — | — | — |
| Zinc | 0.05 max | 0.25 max | 0.1 | 0.1 max | 0.25 max | 5.1-6.1 |
| Zirconium + Ti | — | — | — | — | — | 0.25 max |

One form that the current collector can take is an expanded metal screen or grid, such as a non-woven expanded metal foil. Grids of stainless steel, aluminum or aluminum alloy are available from Dexmet Corporation (Branford, Conn.). A grid composed of aluminum or an aluminum alloy can be lighter and less expensive, have a lower electrical resistance, and have similar strength compared to a grid composed of stainless steel. In order to be processed for ultimate use in a battery, it can be important for a grid to have a high yield strength, such as, for a one inch wide sample, greater than 2.5 lb/in (45.5 kg/m) or greater than 5 lb/in (91 kg/m), and a high tensile strength, such as, for a one inch wide sample, greater than 5 lb/in (91 kg/m) or greater than 7 lb/in (127.3 kg/m), to withstand forces applied to it during cathode manufacture. Yield strength is the maximum pulling force that can be applied to the current collector before it deforms to a certain degree, for example, a 1.14 inch increase in length for a sample initially 22 inches long. Tensile strength is the maximum pulling force that can be applied to the current collector before it breaks.

Figure 2:
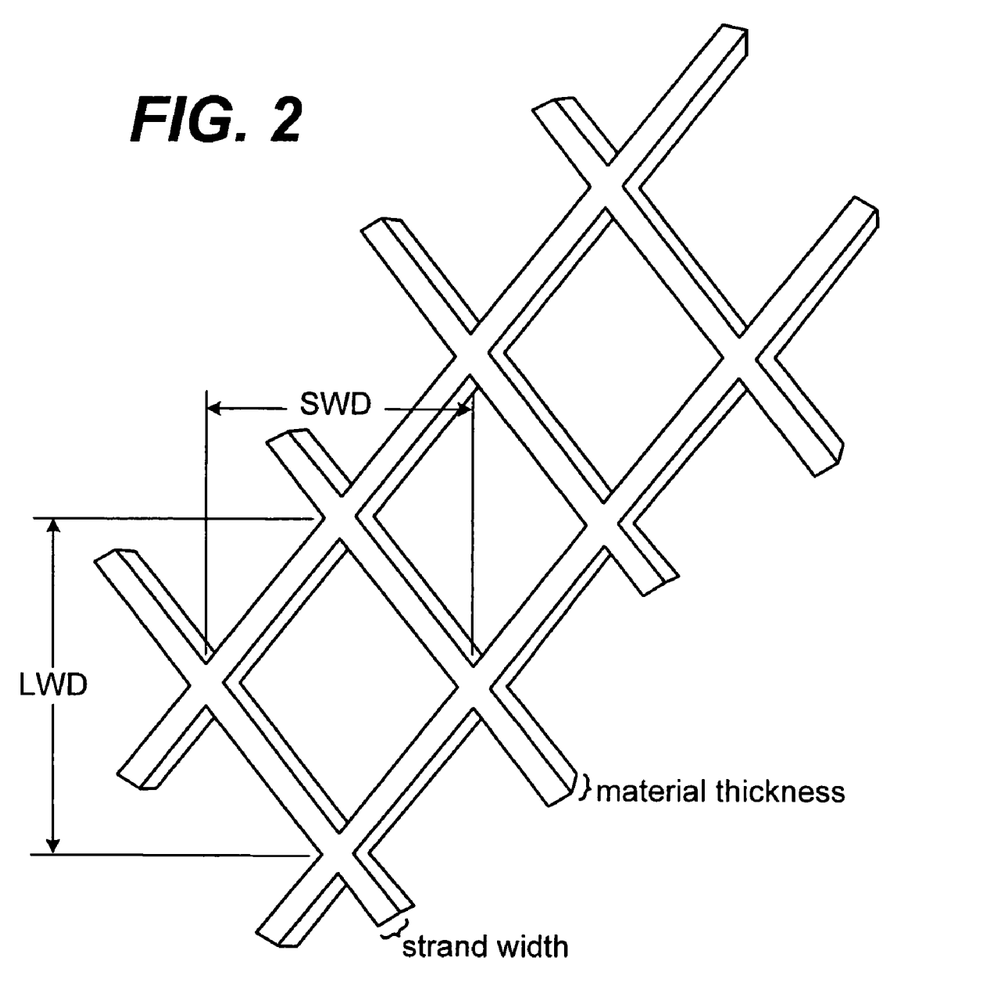
FIG. 2 is a schematic drawing of a grid.

The mechanical and electrical properties of a grid, such as hardness, yield strength, tensile strength, and resistivity, can be influenced by the composition of the grid, the material thickness, strand width, and the grid long dimension (LWD) and short dimension (SWD). The LWD and the SWD of the grid can reflect the machine direction of the grid. FIG. 2 depicts a grid and the various dimensions of the grid. The grid includes an array of diamond-shaped openings. The conductivity of the grid in the LWD differs from the conductivity of the grid in the SWD. In addition, treatment of the grid such as annealing, leveling or pulling can influence its mechanical properties. Annealing, or heat-treatment, can change the hardness or temper of the material. Leveling by passing the grid between rollers can reduce the thickness of the grid, flatten it, and increase its temper by strain hardening. In certain circumstances, a T3, H36 or H38 temper can be desirable. Pulling a grid involves applying a force to alter the grid dimensions, for instance by increasing the SWD. Altering the grid dimensions can alter the current path through the grid, and therefore alter the resistivity in the machine direction and/or the cross direction. Pulling a grid can decrease plasticity and increase tensile strength of the material. The more the grid has been pulled, the less flexible and more brittle it can become.

In general, a cathode is made by coating a cathode material onto, a current collector, drying and then calendering the coated current collector. The cathode material is prepared by mixing an active material together with other components such as a binder, solvent/water, and a carbon source. The current collector can include a metal such as titanium, stainless steel, aluminum, or an aluminum alloy. The current collector can be an expanded metal grid.

To form the cathode material, an active material such as manganese dioxide can be combined with carbon, such as graphite and/or acetylene black, and mixed with small amount of water to form a mull mix. The total carbon in the mull mix can be between 1% and 10%, for example between 5% and 7.5%. The amount of water in the mull mix can be less than 5%, such as between 1% and 3%. A binder, which can be a water/polymer mixture such as a water/polyvinyl alcohol solution, can be mixed with the mull mix. The binder can include less than 10% by weight of the polymer, for example between 5% and 7.5%. The mull mix and binder are further blended with a polymer suspension, for example polytetrafluoroethylene (e.g. Teflon 30) in water, to form a cathode slurry.

The current collector is then coated with the cathode slurry by immersion the current collector in a tank holding the slurry. The slurry can be mixed prior to coating. After passing through the tank, excess slurry can be removed by passing the current collector between blades held at a fixed gap that is determined by the desired thickness of slurry on the current collector. The coated current collector is dried by passing it through a heated oven. Once dried, the coated current collector can be calendered by passing between rolls to press it to a desired thickness. The final thickness after calendering can be in the range of 10 to 30 mils (0.254 to 0.762 mm), such as between 12 and 20 mils (0.305 to 0.508 mm). Calendering can increase the strength of a grid and elongate it by 5-40%. It can be important for the current collector to have a high yield strength to withstand calendering. The porosity of the cathode can be controlled by adjusting the final thickness of the calendered cathode. After calendering, the coated current collector can be cut to a desired size. One edge of the sized cathode can be cleared of cathode material to form a region for the current collector to contact the positive lead. After edging, the cathode can be heat treated for varying periods of time in the range of 30 to 180 minutes under recirculating air at temperatures between 100 and 250° C. The total time can be less than 10 hours. The cathode can be further dried under vacuum at temperatures between 100 and 250° C. prior to being transferred to a dry room for cell assembly. The amount of cathode material on the finished current collector can be in the range of 80-140 mg/cm$^2$.

In a cylindrical cell, the anode and cathode are spirally wound together with a portion of the cathode current collector extending axially from one end of the roll. The portion of the current collector that extends from the roll can be free of cathode active material. To connect the current collector with an external contact, the exposed end of the current collector can be welded to a metal tab, which is in electric contact with an external battery contact. The grid can be rolled in the machine direction, the pulled direction, perpendicular to the machine direction, or perpendicular to the pulled direction. The tab can be welded to the grid to minimize the conductivity of grid and tab assembly. Alternatively, the exposed end of the current collector can be in mechanical contact (i.e. not welded) with a positive lead which is in electric contact with an external battery contact. A cell having a mechanical contact can require fewer parts and steps to manufacture than a cell with a welded contact. The mechanical contact can be more effective when the exposed grid is bent towards the center of the roll to create a dome or crown, with the highest point of the crown over the axis of the roll, corresponding to the center of a cylindrical cell. In the crown configuration, the grid can have a denser arrangement of strands than in the non-shaped form. A crown can be orderly folded and the dimensions of a crown can be precisely controlled.

The positive lead 28 can include stainless steel, aluminum, or an aluminum alloy. A positive lead composed of aluminum or an aluminum alloy can be lighter and less expensive, and have a lower electrical resistance than a positive lead composed of stainless steel. The positive lead can be annular in shape, and can be arranged coaxially with the cylinder. The positive lead can also include radial extensions in the direction of the cathode that can engage the current collector. An extension can be round (e.g. circular or oval), rectangular, triangular or another shape. The positive lead can include extensions having different shapes. The positive lead and the current collector are in electrical contact. It can be preferable for both the current collector and the positive lead to include aluminum. Electrical contact between the positive lead and the current collector can be achieved by mechanical contact.

Figure 3A:
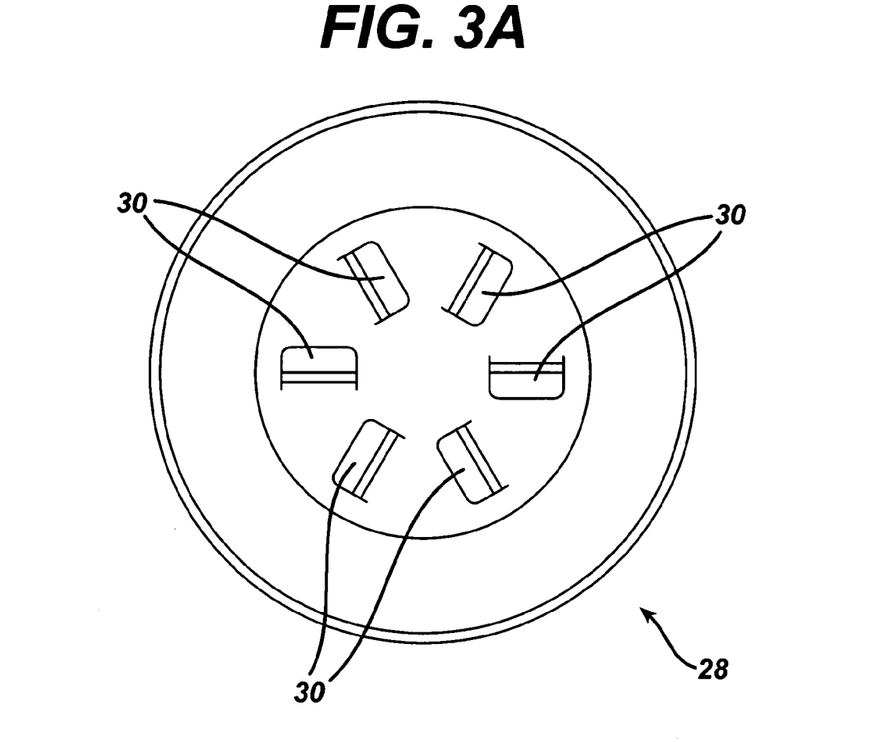
FIGS. 3A and 3B are schematic drawings of a positive lead for a battery.
Figure 3B:
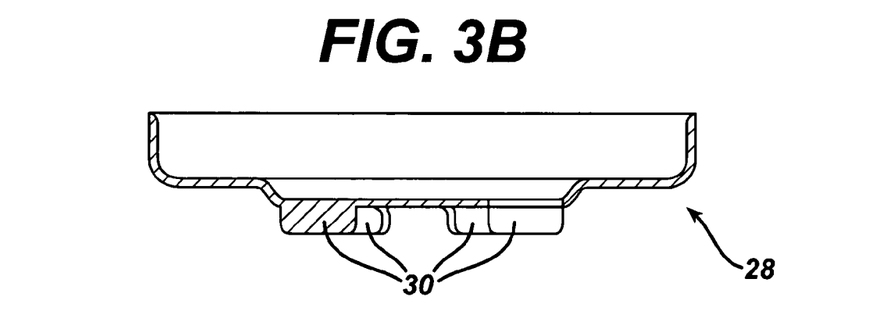

Alternatively, the positive lead and current collector can be welded together. It can be important for a mechanical contact to be robust, in other words, for the parts to remain in mechanical (and therefore also electrical) contact when subjected to a sudden impact, such as when the battery is dropped onto a hard surface. A positive lead can have extensions projecting from a flat surface of the positive lead in the direction of the cathode that can mechanically engage the current collector, for example, a crown. The battery can be more robust when the positive lead includes one or more extensions, that is, the battery is less susceptible to damage when dropped on a hard surface. The extensions can be formed by pressing a tool having complementary shape into a flat blank. A positive lead can have one or more extensions, such as four, six or more extensions. FIGS. 3A and 3B depict a positive lead 28 with six extensions 30. FIG. 3A shows a bottom view (i.e. a view of the surface that contacts a current collector) and FIG. 3B shows a side view of a positive lead.

The positive lead and the cathode current collector are in electrical contact. The electrical contact can be the result of mechanical contact between the positive lead and current collector. Depending on the composition of the positive lead and current collector, the mechanical contact can be a stainless steel-stainless steel contact, an aluminum-stainless steel contact, or an aluminum-aluminum contact. The electrical resistance across an aluminum-aluminum contact can be lower than across a stainless steel-stainless steel contact or an aluminum-stainless steel contact. An aluminum-aluminum contact can be more robust than an aluminum-stainless steel contact in a battery, as measured, for example, by ability of the battery to withstand a user drop test. See Examples 3 and 4 below.

EXAMPLE 1

Five metal grids were measured for tensile strength, yield strength, and resistivity in both the machine direction (MD), along which the grid is pulled, and the transverse direction (TD), perpendicular to the machine direction. After coating and calendering, the thickness and elongation of the grids was measured. The grids were made from 1145 aluminum (Al 1145), 6061 aluminum alloy (Al 6061), or 316L stainless steel (SS 316L). A grid of 6061 aluminum alloy can have a higher yield strength and tensile strength than one of 1145 aluminum alloy, as demonstrated from the results in Table 2.

TABLE 2

| Grid construction | Material | Al 1145 | Al 6061 | Al 6061 | Al 6061 | SS 316L |
|---|---|---|---|---|---|---|
| | Initial foil thickness (mils) | 5 | 5 | 5 | 6 | 4 |
| | Nominal strand width (mils) | 10 | 8 | 8 | 10 | 7 |
| | Nominal grid LWD (mils) | 100 | 100 | 100 | 100 | 100 |
| | Grid treatment | Pulled | None | Pulled | Pulled | None |
| Measured grid properties | Tensile strength, MD (lb/in) | 5.1 | 3.3 | 5.8 | 8.68 | 13.2 |
| | Tensile strength, TD (lb/in) | 7.5 | 11.8 | 6.9 | 7.09 | 83.7 |
| | Yield strength, MD (lb/in) | 2.4 | 1.6 | 2.5 | 5.93 | 2.8 |
| | Yield strength, TD (lb/in) | 2.0 | 9.1 | 2.4 | 3.57 | — |
| | Resistivity, MD (mΩ/cm)* | 1.42 | 2.94 | 1.85 | — | 122.9 |
| | Resistivity, TD (mΩ/cm)* | 0.97 | 0.83 | 1.28 | — | 29.1 |
| | Avg. calendered thickness (mils) | — | — | 16.0 | 15.0 | 14.7 |
| | Avg. calendered elongation (%) | — | — | 10.9 | — | 5.1 |

*Measured resistivity of a 1-cm wide sample.

EXAMPLE 2

Cathodes with current collectors including 6061 aluminum alloy grids were prepared and assembled in tabbed (i.e. the current collector is connected to the external contact by a welded tab) cells. The cathodes had the properties listed in Table 3. The impedance was measured at ambient conditions using an impedance meter set to a frequency of 1000 Hz and capable of measuring voltage to an accuracy of ±1%. Closed circuit voltage was measured immediately after discharging the cell at a constant current of 3 A for 0.5 seconds.

TABLE 3

| Grid construction | Material | Al 6061 | Al 6061 |
|---|---|---|---|
| | Initial foil thickness (mils) | 6 | 6 |
| | Strand width (mils) | 10 | 10 |
| | LWD (mils) | 100 | 100 |
| | Grid treatment | Pulled | Leveled |
| Measured grid properties | Measured strand width (mils) | 9.1 | 10.6 |
| | Measured LWD (mils) | 80.3 | 99.6 |
| | Measured SWD (mils) | 71.6 | 51.2 |
| | Initial grid thickness (mils) | 18.4 | 14.7 |
| | Calendered thickness (mils) | 13.7 | 10.9 |
| | Cathode material loading (mils) | 105.7 | 104.1 |
| Measured cell properties | Average cell impedance (mΩ) | 77.0 | 76.0 |
| | Average closed circuit voltage (V) | 2.82 | 2.83 |
| | Cathode porosity (%) | 32.6 | 33.1 |

EXAMPLE 3

The contact resistance of a 12 cm strip of 6061 aluminum alloy under a 500 g weight was measured for three different metal-metal contacts. The contact resistance between two samples of 6061 aluminum alloy was 29±5 milliOhms, an order of magnitude lower than contacts between two pieces of stainless steel, 265±28 milliOhms, or between a stainless steel and a 6061 aluminum alloy, 372±64 milliOhms.

EXAMPLE 4

Figure 4:
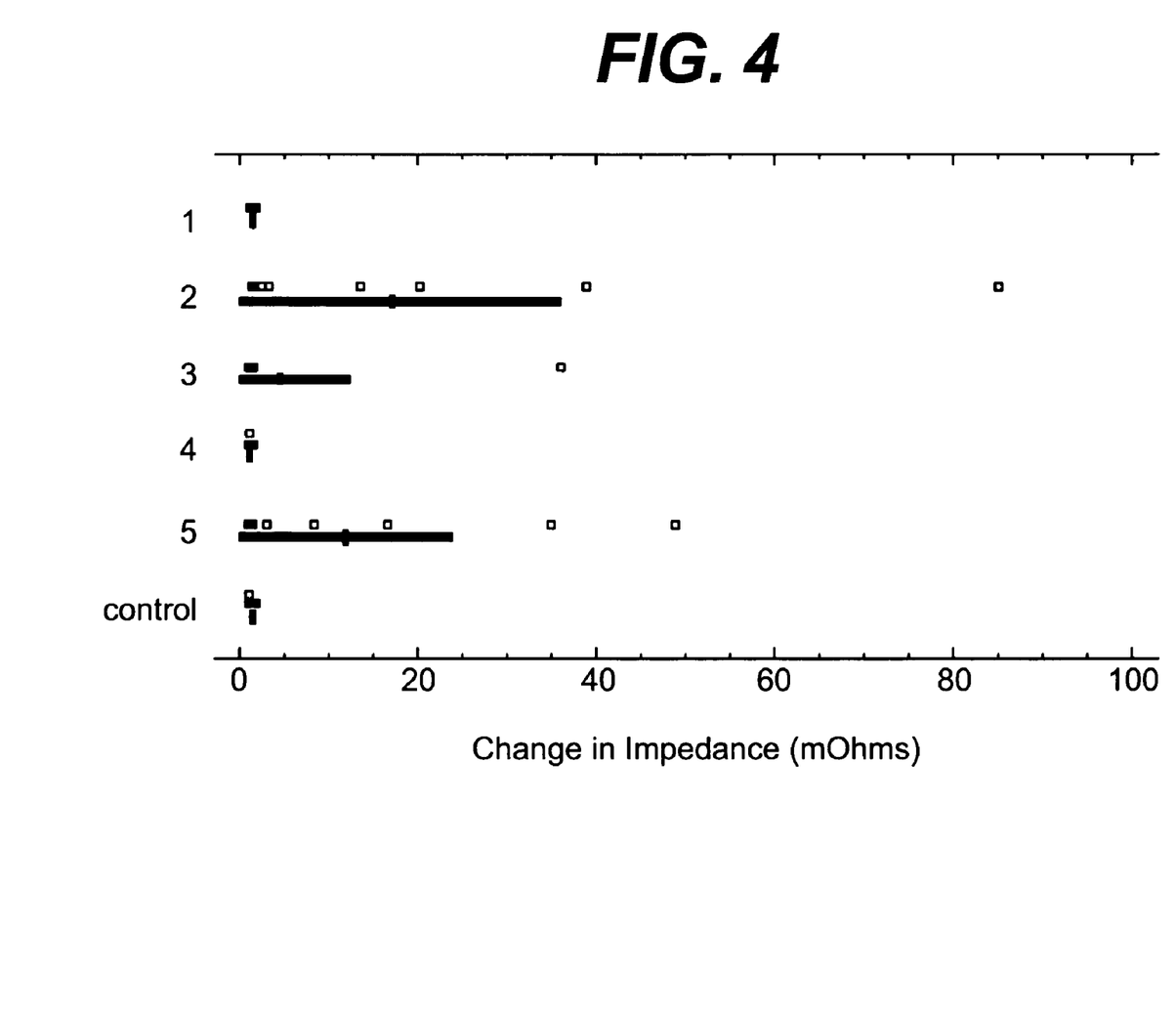
FIG. 4 is a graph depicting change in impedance of batteries after a drop test.
Figure 5:
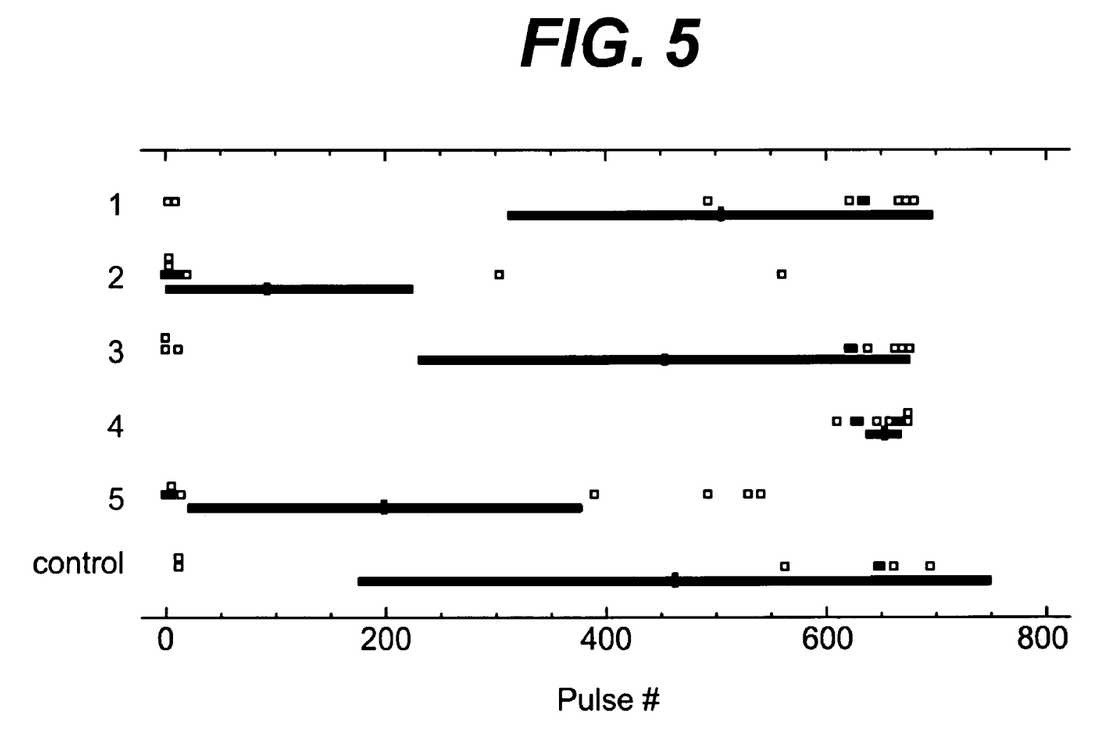
FIG. 5 is a graph depicting battery performance after a drop test.
Figure 6:
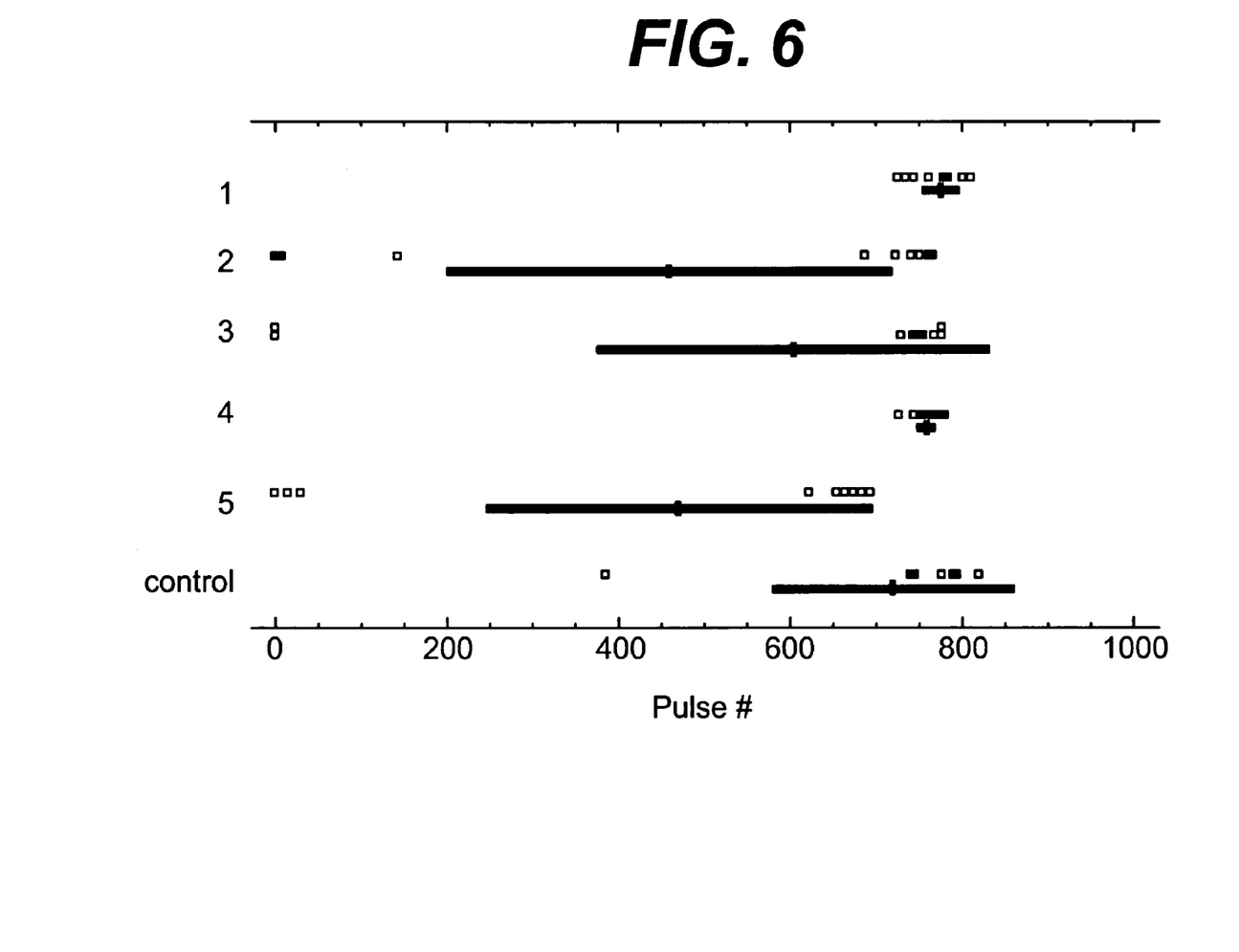
FIG. 6 is a graph depicting battery performance after a drop test.

A series of 2/3A cells were built with various combinations of current collector and positive lead materials. The current collectors were Al 6061 (pulled or unpulled), or 316 stainless steel (SS 316). The positive lead was Al 1145. See Table 4. To determine the robustness of the current collector-positive lead contact, the impedance, closed circuit voltage, and high end camera (HEC) test performance of each type of cell was measured before and after a drop test. In the drop test a cell was dropped six times (two times each in top, bottom, and side orientation) from a height of one meter onto a rigid concrete surface. The impedance was measured at ambient conditions using an impedance meter set to a frequency of 1000 Hz and capable of measuring voltage to an accuracy of ±1%. The measured changes in impedance for the different types of cells after a drop test are shown in FIG. 4. Closed circuit voltage was measured immediately after discharging the cell at a constant current of 3 A for 0.5 seconds. The closed circuit voltages of the different types of cells before and after a drop test are shown in Table 4. An HEC test simulates discharge conditions in a high end camera. Cells are repeatedly discharged at a current of 1.8 A for 3 seconds followed by a 7 second rest period. The voltage is recorded at the end of the discharge period. The discharge-rest cycle is repeated until the cell reaches a predetermined cutoff voltage. The number of pulses before cutoff voltages of 2.2 V and 2.0 V were reached are shown in FIGS. 5 and 6, respectively. The results are summarized in Table 4. In FIGS. 4, 5, and 6, squares represent the performance of individual cells, the vertical bars represent the average, and the horizontal bars represent the standard deviation for each type of cell. The cell numbers listed in the first column of Table 4 correspond to the numbers in FIGS. 4, 5, and 6. In one case, the positive lead was modified with extensions that projected toward the cathode, indicated in Table 4 as "ext". The notation "DB" indicates that the grid was pulled. "DDB" indicates that the grid was pulled more than a grid noted as "DB".

TABLE 4

| Cell # | Grid material | Positive lead material | Impedance, fresh (Ohms) | Impedance change after drop (Ohms) | CCV, fresh (V) | CCV change after drop (V) |
|---|---|---|---|---|---|---|
| 1 | Al 6061 | SS 316 | 0.144 | 0.28 | 2.45 | −0.25 |
| 2 | Al 6061 DB | SS 316 | 0.206 | 15.9 | 2.29 | −0.90 |
| 3 | Al 6061 DB | Al (no ext) | 0.130 | 3.57 | 2.54 | −0.92 |
| 4 | Al 6061 DB | Al (ext) | 0.127 | 0.06 | 2.56 | −0.14 |
| 5 | Al 6061 DDB | SS 316 | 0.201 | 10.7 | 2.25 | −0.92 |
| Control | SS 316 | SS 316 | 0.150 | 0.14 | 2.42 | −0.23 |

EXAMPLE 5

A series of 2/3A cells were built with various combinations of current collector and positive lead materials and subjected to a drop test, as described above. The current collectors were either Al 6061 or stainless steel 316L. The positive lead was Al 3003, Al 5052 H36, or stainless steel 316L. The closed circuit voltage of the cells was measured before and after the drop test. See Table 5.

TABLE 5

| Grid material | Positive lead material | CCV, fresh (V) | CCV change after drop (V) |
|---|---|---|---|
| Al 6061 | Al 3003 | 2.420 | 0.073 |
| Al 6061 | Al 5052 H36 | 2.430 | 0.042 |
| SS 316 | SS 316 | 2.493 | 0.200 |

A number of embodiments have been described. Nevertheless, it will be understood that various modifications may be made. Accordingly, other embodiments are within the scope of the following claims.

What is claimed is:

1. A method of making a cathode for a primary lithium battery comprising:
   step A: pulling an expanded metal grid including aluminum and having an initial tensile strength and an array of diamond-shaped openings, each opening having a long dimension and a short dimension, and each opening defined by four elongated boundary elements, each boundary element having a length and the pulling being along a direction other than along the length of any of the elements, the pulling providing a pulled expanded metal grid having an increase in the short dimension of the openings and an increase in the tensile strength to greater than 5 lb/in;
   step B: leveling the pulled expanded metal grid by passing the pulled expanded metal grid between rollers, and
   step C: coating the pulled expanded metal grid with a composition including a cathode active material to provide a coated and pulled expanded metal grid,
   wherein leveling is conducted before coating and in a separate step before step C.

2. The method of claim 1, wherein the composition is a slurry.

3. The method of claim 1, wherein the cathode active material includes a manganese dioxide, a $CF_x$, iron disulfide, or a vanadate.

4. The method of claim 1, wherein the composition includes a carbon source.

5. The method of claim 4, wherein the carbon source includes a carbon fiber, a graphite, an acetylenic carbon, or a combination thereof.

6. The method of claim 1, wherein the composition includes a binder.

7. The method of claim 6, wherein the binder includes an organic polymer.

8. The method of claim 1, wherein the grid includes a 1000 series aluminum, a 2000 series aluminum alloy, a 3000 series aluminum alloy, a 5000 series aluminum alloy, a 6000 series aluminum alloy, or a 7000 series aluminum alloy.

9. The method of claim 1, wherein the grid includes a 6000 series aluminum alloy.

10. The method of claim 1, wherein the grid includes an aluminum alloy including 0-0.4% by weight of chromium.

11. The method of claim 1, wherein the grid includes an aluminum alloy including 0.01-6.8% by weight of copper.

12. The method of claim 1, wherein the grid includes an aluminum alloy including 0.05-1.3% by weight of iron.

13. The method of claim 1, wherein the grid includes an aluminum alloy including 0.1-7% by weight of magnesium.

14. The method of claim 1, wherein the grid includes an aluminum alloy including 0-2% by weight of manganese.

15. The method of claim 1, wherein the grid includes an aluminum alloy including 0-2% by weight of silicon.

16. The method of claim 1, wherein the grid includes an aluminum alloy including less than 0.25% by weight of titanium.

17. The method of claim 1, wherein the grid includes an aluminum alloy including 0-8.2% by weight of zinc.

18. The method of claim 1, wherein the grid includes an aluminum alloy including 0-2.3% by weight of nickel.

19. The method of claim 1, wherein the grid has a resistivity of less than 100 mΩ/cm.

20. The method of claim 1, wherein the grid has a resistivity of less than 10 mΩ/cm.

21. The method of claim 1, further comprising drying the coated and pulled expanded metal grid.

22. The method of claim 21, further comprising calendering the coated and pulled expanded metal grid after drying.

23. The method of claim 22, wherein calendering includes passing the coated and pulled expanded metal grid through a gap having a thickness of less than 25 mils.

24. The method of claim 23, further comprising heat treating the coated and pulled expanded metal grid after calendering.

25. The method of claim 24, further comprising drying the coated and pulled expanded metal grid under vacuum after heat treating.

26. The method of claim 9, wherein the composition is a slurry.

27. The method of claim 9, wherein the cathode active material includes a manganese dioxide, a $CF_x$, iron disulfide, or a vanadate.

28. The method of claim 9, wherein the composition includes a carbon source.

29. The method of claim 28, wherein the carbon source includes a carbon fiber, a graphite, an acetylenic carbon, or a combination thereof.

30. The method of claim 9, wherein the composition includes a binder.

31. The method of claim 28, wherein the binder includes an organic polymer.

32. The method of claim 9, further comprising drying the coated and pulled expanded metal grid.

33. The method of claim 32, further comprising calendering the coated and pulled expanded metal grid after drying.

34. The method of claim 33, wherein calendering includes passing the coated and pulled expanded metal grid through a gap having a thickness of less than 25 mils.

35. The method of claim 1, wherein coating the pulled expanded metal grid comprises immersing the metal grid in the composition including the cathode active material.

36. The method of claim 1, wherein the cathode active material includes manganese dioxide.

37. The method of claim 1, wherein the cathode active material includes an iron disulfide.

* * * * *